United States Patent
Turner et al.

(10) Patent No.: US 10,253,583 B2
(45) Date of Patent: Apr. 9, 2019

(54) IN SITU LENGTH EXPANSION OF A BEND STIFFENER

(71) Applicant: Halliburton Energy Services, Inc., Houston, TX (US)

(72) Inventors: Alan Charles John Turner, Stonehaven (GB); Richard Ian Gillings, Aberdeen (GB); Duncan Forbes Hay, Oldmeldrum (GB)

(73) Assignee: Halliburton Energy Services, Inc., Houston, TX (US)

( * ) Notice: Subject to any disclaimer, the term of this patent is extended or adjusted under 35 U.S.C. 154(b) by 67 days.

(21) Appl. No.: 15/325,393

(22) PCT Filed: Dec. 21, 2015

(86) PCT No.: PCT/US2015/067067
§ 371 (c)(1),
(2) Date: Jan. 10, 2017

(87) PCT Pub. No.: WO2017/111900
PCT Pub. Date: Jun. 29, 2017

(65) Prior Publication Data
US 2018/0216426 A1    Aug. 2, 2018

(51) Int. Cl.
*F16L 1/235* (2006.01)
*F16L 1/12* (2006.01)
(Continued)

(52) U.S. Cl.
CPC .............. *E21B 19/22* (2013.01); *E21B 15/02* (2013.01); *E21B 17/01* (2013.01); *E21B 17/20* (2013.01);
(Continued)

(58) Field of Classification Search
CPC ...... E21B 47/0006; E21B 17/20; E21B 19/08; E21B 19/22; E21B 3/04; E21B 17/01;
(Continued)

(56) References Cited

U.S. PATENT DOCUMENTS

| | | | | |
|---|---|---|---|---|
| 1,596,569 A | * | 8/1926 | Zerbe | E21B 3/04 173/164 |
| 1,628,283 A | * | 5/1927 | Waldo | E21B 3/04 279/155 |

(Continued)

OTHER PUBLICATIONS

International Search Report and Written Opinion dated Sep. 20, 2016; International PCT Application No. PCT/US2015/067067.

*Primary Examiner* — Benjamin F Fiorello
*Assistant Examiner* — Edwin J Toledo-Duran
(74) *Attorney, Agent, or Firm* — McGuireWoods LLP

(57) ABSTRACT

A bend stiffener is operable to be installed on site in a collapsed state and expanded upon installation to provide increased coverage of a tubing string to be reinforced by the bend stiffener. The bend stiffener is expandable upon the tripping of tubing through the bend stiffener. The bend stiffener includes a flexible sleeve having an outer flange at an upper end and sized to receive the tubing. The bend stiffener also includes an intermediary sleeve and an external sleeve. The intermediary sleeve has a cylindrical body and an internal flange for engaging and supporting the outer flange of the flexible sleeve. Similarly, the external sleeve has an internal flange for supporting an external flange of the intermediary sleeve. When installed, the flexible sleeve slides from the intermediary sleeve and the intermediary sleeve slides from the external sleeve so that each sleeve encloses and reinforces a segment of tubing.

18 Claims, 3 Drawing Sheets

(51) Int. Cl.
 *E21B 19/22* (2006.01)
 *E21B 15/02* (2006.01)
 *E21B 17/01* (2006.01)
 *E21B 17/20* (2006.01)
 *E21B 19/00* (2006.01)
 *F16L 1/15* (2006.01)
 *F16L 1/16* (2006.01)

(52) U.S. Cl.
 CPC ............ *E21B 19/002* (2013.01); *F16L 1/15* (2013.01); *F16L 1/16* (2013.01); *F16L 1/235* (2013.01)

(58) Field of Classification Search
 CPC .......... E21B 19/02; E21B 23/00; E21B 33/03; E21B 33/038; E21B 33/04; E21B 33/0422; E21B 33/043; E21B 33/06; E21B 33/061; E21B 33/062; E21B 33/076; E21B 17/017; B63B 35/03; F16L 1/20; F16L 1/203; F16L 1/23; F16L 1/235
 USPC ............ 405/158, 168.1–168.4, 183.5, 184.4; 166/345, 348, 349, 351, 352, 367, 77.1, 166/77.2, 77.51, 85.1, 85.3, 85.5, 166/86.1–89.3, 78.1, 80.1, 82.1–84.5, 166/92.1–97.1, 75.13
 See application file for complete search history.

(56) References Cited

U.S. PATENT DOCUMENTS

| | | | | |
|---|---|---|---|---|
| 1,861,755 A * | 6/1932 | Rasmussen | ............. | E21B 33/06 277/324 |
| 2,007,666 A * | 7/1935 | Smith | ............. | E21B 17/00 173/150 |
| 2,124,015 A * | 7/1938 | Stone | ............. | E21B 33/06 251/1.1 |
| 2,306,130 A * | 12/1942 | Long | ............. | E21B 3/04 464/165 |
| 2,956,783 A * | 10/1960 | Gohte | ............. | E21B 7/20 175/202 |
| 3,729,941 A * | 5/1973 | Rochelle | ............. | E21B 43/0107 166/347 |
| 4,428,592 A * | 1/1984 | Shaffer | ............. | E21B 33/06 251/1.2 |
| 4,986,360 A * | 1/1991 | Laky | ............. | E21B 19/22 166/351 |
| 5,411,085 A * | 5/1995 | Moore | ............. | E21B 17/20 166/242.2 |
| 5,682,952 A * | 11/1997 | Stokley | ............. | E21B 17/02 166/373 |
| 5,863,022 A * | 1/1999 | Van Winkle | ............. | E21B 33/06 251/1.1 |
| 6,129,486 A * | 10/2000 | Putnam | ............. | E21B 19/00 254/29 R |
| 6,202,764 B1* | 3/2001 | Ables | ............. | E21B 17/025 166/242.5 |
| 6,220,303 B1 | 4/2001 | Secher et al. | | |
| 7,165,619 B2* | 1/2007 | Fox | ............. | E21B 7/124 166/343 |
| 8,322,433 B2* | 12/2012 | Bedouet | ............. | E21B 17/07 166/250.01 |
| RE45,331 E * | 1/2015 | Webre | ............. | E21B 17/026 166/379 |
| 9,309,733 B2* | 4/2016 | Xu | ............. | E21B 23/01 |
| 9,441,426 B2* | 9/2016 | Gutierrez-Lemini | ............. | E21B 17/085 |
| 2002/0195247 A1* | 12/2002 | Ciglenec | ............. | E21B 7/06 166/250.11 |
| 2003/0209346 A1* | 11/2003 | Austbo | ............. | B65G 23/14 166/77.2 |
| 2004/0079533 A1* | 4/2004 | Buytaert | ............. | E21B 19/10 166/380 |
| 2004/0094305 A1* | 5/2004 | Skjærseth | ............. | E21B 7/124 166/339 |
| 2007/0056741 A1 | 3/2007 | Finn et al. | | |
| 2008/0007056 A1* | 1/2008 | Beesley | ............. | E21B 17/017 285/321 |
| 2008/0210063 A1* | 9/2008 | Slack | ............. | E21B 19/06 81/420 |
| 2008/0295912 A1 | 12/2008 | Louvain-Walters | | |
| 2010/0213015 A1 | 8/2010 | Clevelario et al. | | |
| 2010/0228295 A1* | 9/2010 | Whitefield | ............. | E21B 17/017 606/278 |
| 2011/0042094 A1* | 2/2011 | Pionetti | ............. | E21B 17/01 166/345 |
| 2011/0067887 A1* | 3/2011 | Moncus | ............. | E21B 19/22 166/384 |
| 2011/0155379 A1* | 6/2011 | Bailey | ............. | E21B 19/16 166/324 |
| 2011/0203791 A1* | 8/2011 | Jin | ............. | E21B 17/042 166/244.1 |
| 2011/0209651 A1* | 9/2011 | Yemington | ............. | B63B 17/00 114/122 |
| 2012/0160508 A1* | 6/2012 | Thommesen | ............. | E21B 17/01 166/355 |
| 2012/0241037 A1 | 9/2012 | Lund | | |
| 2014/0048277 A1* | 2/2014 | June | ............. | E21B 33/035 166/348 |
| 2014/0346772 A1* | 11/2014 | Gutierrez-Lemini | ............. | E21B 17/085 285/302 |
| 2017/0306716 A1* | 10/2017 | Hajjari | ............. | E21B 33/127 |

* cited by examiner

IN SITU LENGTH EXPANSION OF A BEND STIFFENER

FIELD

The present disclosure relates to the production of hydrocarbons, and more particularly to systems for deploying coiled tubing from a floating vessel to conduct either intervention operations into a pipeline or a subsea structure such as a well or manifold.

BACKGROUND

Offshore hydrocarbon exploration and producing operations are typically executed from a vessel or drilling rig. A drilling rig may be located on a floating platform or a bottom-founded platform that extends upward from the sea floor (i.e., a riser). While a bottom-founded platform is supported by the sea floor, a floating platform is typically based on a ship or tension-leg platform which is supported by buoyancy and floats at the surface of the water. Floating platforms may be untethered and be riser-less, and may be considered the norm in deep-water drilling, production and intervention applications.

Operations from floating platforms may involve riser less activities using a coiled tubing tool string which is deployed from a spool on the floating platform. The tool string may be unsupported between the floating platform and a tie in point below surface e.g. at the sea floor. The tool string may extend through the surface tie in point into a geological formation to form, prepare, or operate a well. The coiled tubing may generally be understood to be a continuous lighter weight string, as compared to string segments assembled from thicker-gauge steel pipe. The coiled tubing tool string may function as a drilling tool string, but may also be used for intervention purposes or as a tie in mechanism to a subsea manifold.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

The present disclosure relates to a coiled-tubing bend stiffener that is used to prevent excessive bending of a coiled tubing string from a deployment location, such as a floating platform. The bend stiffener has a first, flexible sleeve that has a first outer flange at an upper end. The flexible sleeve is sized and configured to receive a segment of coiled tubing and as such, may have an inner diameter that is nominally larger or approximately equal to the diameter of the tubing, though some clearance may be provided to account for any intermediary components. The bend stiffener also includes an intermediary sleeve that is generally cylindrical but has an inner intermediary flange extending from a lower end and an outer intermediary flange extending from an upper end. Outside of the intermediary sleeve is a generally cylindrical external sleeve that has an internal flange extending from a lower end of the external sleeve. The first, flexible sleeve is positioned within the intermediary sleeve and the intermediary sleeve is positioned within the external sleeve. The assembly allows for the flexible sleeve to slide downward from the intermediary sleeve until the first outer flange engages the inner intermediary flange. Similarly, the inner intermediary flange is allowed to slide downward from the external sleeve until the outer intermediary flange engages the internal flange of the external sleeve. The components of the bend stiffener are thereby nested together such that the bend stiffener may be shipped in a compact, contracted state, and then extended upon deployment to provide a bend stiffener that may be provided with an extended length at the site of deployment.

Figure 1:
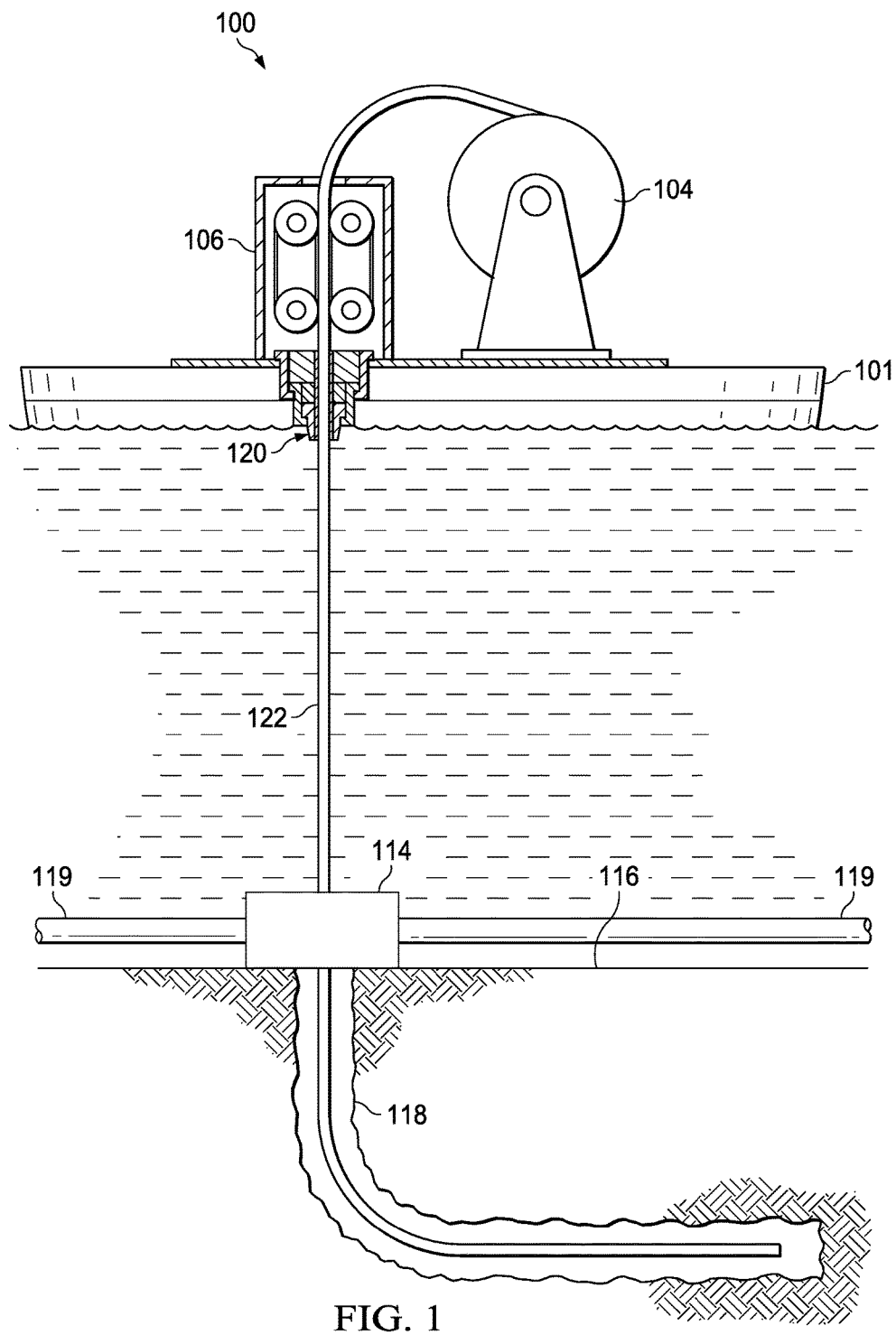
FIG. 1 is a schematic, side view of a floating platform from which a coiled tubing tool string has been deployed into a wellbore.

As noted above, coiled tubing tool strings may be used in any number well development and production operations, including drilling, logging, production and pipeline commissioning. A representative system 100 is shown in FIG. 1. The system 100 includes a tool string 122, which is shown as being deployed in a riserless setting from a floating platform 101. The tool string 122 is deployed towards a subsea manifold 114 that may be near a wellbore 118 at the sea floor 116. The tie-in point connecting the tool string 122 to the subsea manifold 114 may be at the sea floor 116 or may be located at a point above the sea floor 116. Pipes 119 connect the subsea manifold 114 to other subsea manifolds (not shown), trees (not shown), or wells (not shown) to provide conduits to and from the respective structures. The tool string 122 may be coiled tubing and may be deployed from a spool 104 with or without the use of an injector 106. A bend stiffener 120 is attached to the platform 101, and the tool string 122 is routed through the bend stiffener 120, so that the bend stiffener 120 may function to reinforce the tool string 122 at the point of deployment to minimize shear stresses experienced by the coiled tubing at surface which forms the deployment string.

The tool string 122 may be formed from a metal, such as steel, a composite, or any other suitable material. Since the tool string 122 is unsupported below the bend stiffener 120 the tool string 122 is subject to tensile forces resulting from the weight of the deployed length of tubing during deployment in addition to shear and torsional forces resulting from the effects of water currents on the tool string 122 and platform 101. The tool string 122, as shown in the deployment of FIG. 1, is laterally constrained from movement at the platform 101 and at the subsea manifold 114. The intermediate portion of the coiled tool string 122, however, may deform laterally or "bow" as a result of lateral forces generated by water currents. This type of deformation may become larger as depth increases and water currents generate a force over a greater length of the deployed portion of the tool string 122.

As depth increases and corresponding lateral forces increase, the tool string 122 may exhibit a tendency to buckle. This tendency may be exhibited more prominently at the floating platform 101 and at the subsea manifold 114 where the tool string 122 is constrained. The buckling tendency is understood to result from the tool string 122 bending with too small of a bend radius, and is most likely to occur at the points of constraint. The bend stiffener 120 operates to reinforce the tool string 122, enhancing ability of the tool string 122 to withstand the above mentioned lateral forces that might otherwise induce buckling.

The bend stiffener 120 helps to maintain a minimum bend radius for the tool string 122 in the interest of preventing failure of the tool string 122. A bend limiter or bend stiffener, as discussed herein, is generally understood to be any device that restricts bending of a tube. Conventional bend limiters include bellmouths and bend restrictors. A bellmouth is a flared, funnel-shaped device having a radius of curvature that is selected based on the minimum allowable bend radius of the tubing used to form the tool string 122. A conventional bend restrictor or bend stiffener serves the same purpose, but can be formed from opposing, interlocking half-ring segments that resist bending beyond a selected radius of curvature. A bend stiffener can also be a single piece cone shaped device.

In an illustrative embodiment of the present disclosure, a bend stiffener 120 is provided that is collapsible and expandable. The bend stiffener may occupy a selected amount of space in a payload or shipping container in a first, collapsed state. In a second, expanded state, the bend stiffener may be deployed over an expanded length of the tool string that is being reinforced by the bend stiffener, thereby providing an enhanced resistance to buckling while still being transportable using more conventional shipping and installation methods.

Figure 2:
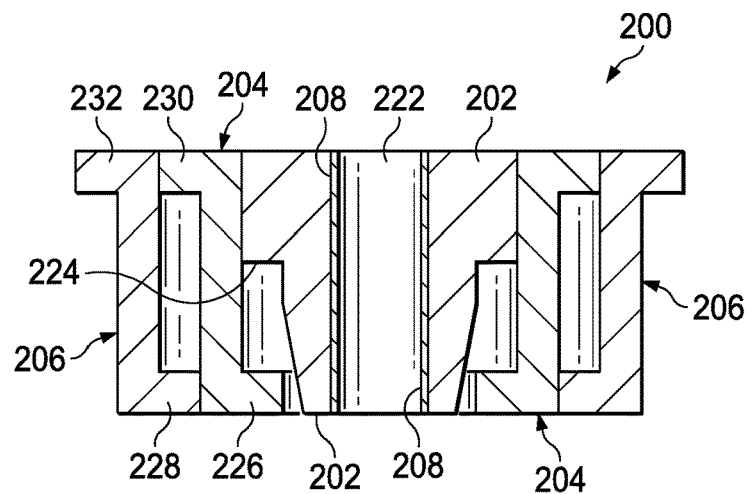
FIG. 2 is a side, section view of a bend stiffener that may be used to reinforce the tool string of FIG. 1 in an unexpanded state.

Referring now to FIG. 2, a bend stiffener 200 is shown in the collapsed, un-deployed state. The bend stiffener 200 includes a first, flexible sleeve 202 that is fabricated to be in contact with, or very close to, the tool string to be supported by the bend stiffener 200. In an embodiment, the first, flexible sleeve 202 is fabricated from the same material as the tool string. As such, the flexible sleeve may be a steel alloy, titanium alloy, composite, or any other suitable material. The first, flexible sleeve 202 may include a contact sleeve 208. The contact sleeve 208 may be a polytetrafluoroethylene surface, a brass alloy surface, or any other suitable material. In an embodiment, the contact sleeve 208 is an intermediate component that is selected to reduce-friction against the surface of tubing that is tripped though a center-bore 222 of the first, flexible sleeve 202.

Figure 4A:
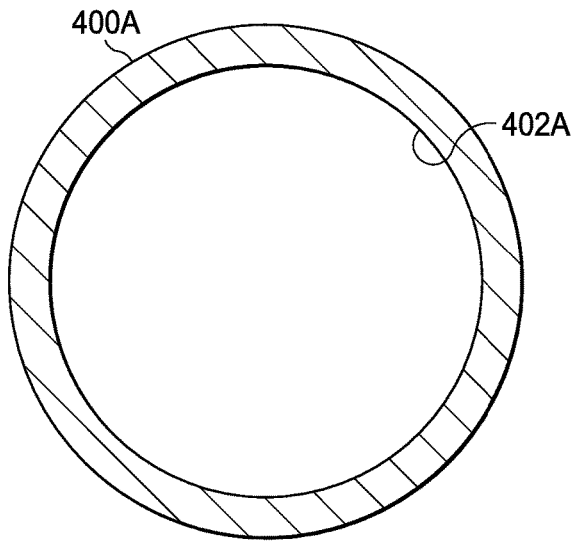
FIGS. 4A-4C are sectional views of internal features of alternative embodiments interior surfaces of the bend stiffener of FIGS. 2 and 3.
Figure 4B:
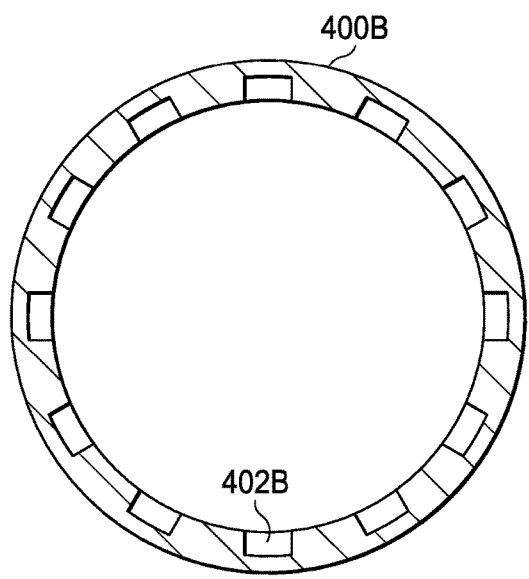
Figure 4C:
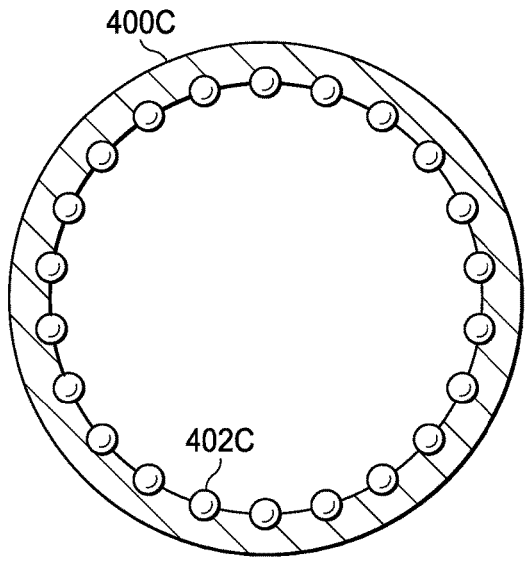

A variety of contact sleeves 400 are shown in FIGS. 4A-4C and are analogous to the contact sleeve 208 described with regard to FIG. 2. A contact sleeve 400A may have a smooth, low friction inner surface 402A, as shown in FIG. 4A. Alternatively, or in addition, a contact sleeve 400B may have a castellated inner surface 402B, as shown in FIG. 4B. As a further alternative or additional friction reducing measure, a contact sleeve 400C may have ball bearings 402C or rollers contact tubing that is run through the contact sleeve 400C.

Referring again to FIG. 2, the first, flexible sleeve 202 may be configured to be flexible to provide a bending radius for tubing that is reinforced by the bend stiffener. To facilitate such flexibility, the thickness of the flexible sleeve 202 may be selected to allow a selected bend radius at the base of the first, flexible sleeve 202. In an embodiment, the selected bend radius may decrease, or provide for a sharper bend, at the base of the first, flexible sleeve 202. In such an embodiment, the first, flexible sleeve 202 may be tapered such that a lower portion of the first, flexible sleeve 202 is thinner than the upper portion of the first, flexible sleeve 202. In FIG. 2, the first, flexible sleeve 202 has a constant inner diameter and a tapered outer surface 214. The tapered outer surface 214 has a first outer diameter at a lower end and a second outer diameter at the upper end. The first diameter is smaller than the second outer diameter and may approach the inner diameter at the lower end.

The first, flexible sleeve 202 may also include a first, outer flange 224. The first, outer flange may support the first flexible, sleeve 202 when the bend stiffener 200 is deployed, as described below with regard to FIG. 3. In a collapsed, unexpanded state, however, the first outer flange 224 is offset from an inner intermediary flange 226 of an intermediary sleeve 204. Similar to the first, flexible sleeve 202, the intermediary sleeve 204 includes a generally cylindrical body having an outer intermediary flange 230 and is formed from a similar material to the first, flexible sleeve 202. The outer intermediary flange 230 supports the intermediary sleeve 204 when the bend stiffener 200 is in an expanded, deployed state, as described below with regard to FIG. 3. In the collapsed state shown in FIG. 2, however, the outer intermediary flange 230 is offset from an internal flange 228 of an external sleeve 206. The external sleeve 206 also has a generally cylindrical body and may be formed from a similar material to the first, flexible sleeve 202 and intermediary sleeve 204.

In some embodiments, the bend stiffener 200 may include multiple intermediary sleeves 230 nested within one another. In such embodiments, the innermost intermediary sleeve is adjacent the first, flexible sleeve 202 and the outermost intermediary sleeve 204 is adjacent the external sleeve 206. Two, three, four, or more additional intermediary sleeves 204 may be used. In the embodiment shown in FIG. 2, the first, flexible sleeve 202 is positioned within the intermediary sleeve 204, which is in turn positioned within the external sleeve 206.

In a preferred embodiment, the first, flexible sleeve 202, intermediary sleeve 204, and external sleeve 206 may each have about the same height such that for a given collapsed height, the an increased bend stiffener length, or expanded height may be obtained in an expanded state. To that end, the first, flexible sleeve 202 may be sized to slide within the intermediary sleeve 204, and the intermediary sleeve 204 may be sized to slide within the external sleeve in a telescoping manner (i.e., in a manner resembling the nested sleeves of some telescopes).

To accommodate such sliding while maintaining rigidity, the outer diameter of the first, outer flange 224 is approximately equal to, or only slightly smaller than, the inner diameter of the cylindrical body of the intermediary sleeve 204 and the outer diameter of the generally cylindrical body of the first, flexible sleeve 202 may be approximately equal to, or slightly smaller than, the inner diameter of the inner intermediary flange 226. In addition or in the alternative, fasteners, welds, or other joints may be used to join the first, outer flange 224 to the inner intermediary flange 226 when the bend stiffener is in an expanded state. Similarly, the outer diameter of the outer intermediary flange 230 is approximately equal to, or only slightly smaller than, the inner diameter of the cylindrical body of the external sleeve 206 and the outer diameter of the generally cylindrical body of the intermediary sleeve 204 may be approximately equal to, or slightly smaller than, the inner diameter of the internal flange 228 of an external sleeve 206. In addition or in the alternative, fasteners, welds, or other joints may be used to join the outer intermediary flange 230 to the inner flange 228 of the external sleeve 206 when the bend stiffener is in an expanded state. In some embodiments, the flexible sleeve 202, the contact sleeve 208, the split sleeves 210 and 212, the outer flange 224, and the intermediary flange 230 also have castellated outer surfaces to facilitate installation of the components of the bend stiffener 200.

Figure 3:
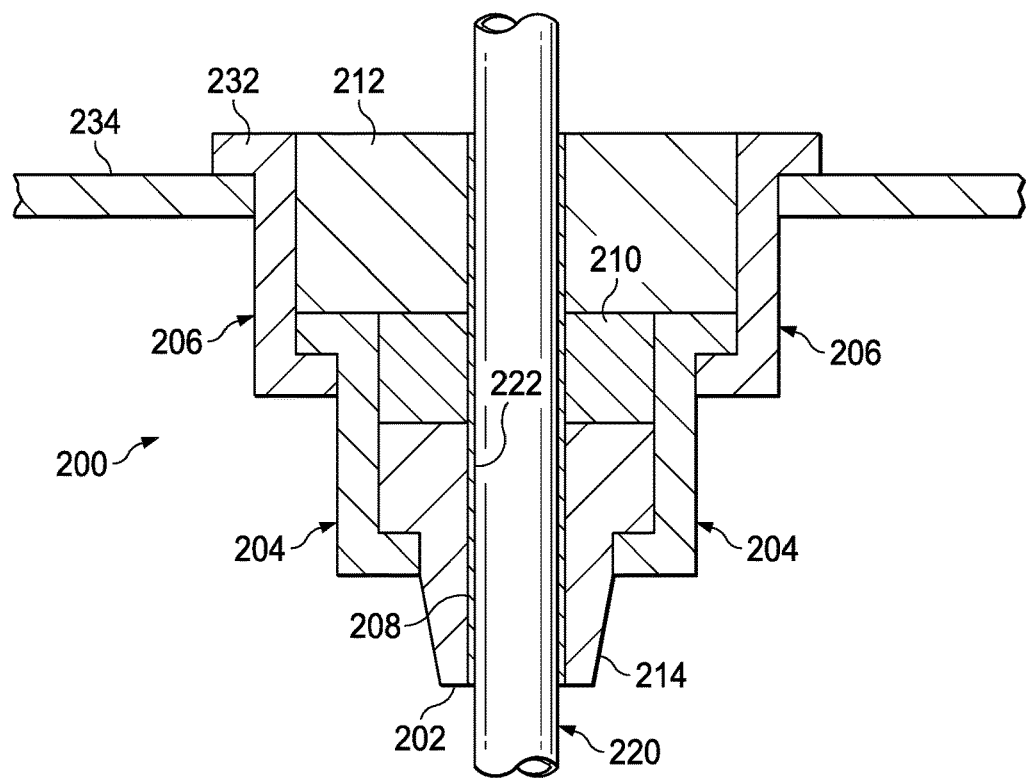
FIG. 3 is a side, section view of a bend stiffener that may be used to reinforce the tool string of FIG. 1 in an expanded state.

Referring now to FIG. 3, the bend stiffener 200 is shown in an expanded, deployed state. In the deployed state, the first, flexible sleeve 202 is fully extended from the intermediary sleeve 204, which is in turn fully extended from the external sleeve 206. A segment of coiled tubing 220 has been run through the center-bore 222 of the bend stiffener 200, and an external flange 232 of the external sleeve is fastened or fixed relative to a support structure of, for example, a platform.

In the expanded state, the length of the bend stiffener 200 is increased so that the bend stiffener 200 reinforces an increased length of tubing 220 relative to the length that could be supported by the collapsed bend stiffener 200. In an embodiment, the first, flexible sleeve 202, intermediary sleeve 204, and external sleeve 206 may have a length of approximately eight meters in a collapsed state and just under twenty-four meters in an expanded state. In the expanded state, a lower surface of the first outer flange 224 contacts an upper surface of inner intermediary flange 226 and a lower surface of outer intermediary flange 230 is offset from an internal flange 228 of external sleeve 206. In this expanded configuration, the external sleeve 206 is supported by a platform 234 or other support structure, the intermediary sleeve 204 is supported by the external sleeve 206, and the first, flexible sleeve 202 is supported by the intermediary sleeve 204.

To enhance stiffness or otherwise provide for insulation between the tubing 220 and the intermediary sleeve 204 and/or between the tubing 220 and external sleeve 206, one or more split sleeves 210, 212 may be inserted. The split sleeves 210, 212 of FIG. 3 are inserted as collars about the tubing 220 to occupy empty space between the tubing 220 and intermediary sleeve 204 and between the tubing 220 and external sleeve 206, respectively. The split sleeves 210, 212 may restrict bending of the tubing 220 above the first, flexible sleeve 202. In such an embodiment, the lower split sleeve 210 has an outer diameter that is approximately equal to or slightly less than the inner diameter of the cylindrical body of the intermediary sleeve 204 and the upper split sleeve 212 has an outer diameter that is approximately equal to or slightly less than the inner diameter of the cylindrical body of the external sleeve 206. The inner diameter of the lower split sleeve 210 and upper split sleeve 212 may be approximately equal to or slightly larger than the tubing 220 to provide a close fit.

In accordance with a first illustrative method for deploying the bend stiffener 200, the external sleeve 206 may first be installed or fixed relative to a platform 234 or other support structure. Thereafter, the coiled tubing may be run through the center-bore 222 from, for example, a spool, to a downhole location (e.g., a subsea wellhead). The method includes extending or allowing to extend, the first, flexible sleeve 202 from the intermediary sleeve 204 and the intermediary sleeve 204 from the external sleeve 206. Once extended, the first flexible sleeve 202 may be fixed relative to the intermediary sleeve 204 by, for example, joining the first, outer flange 224 to the inner intermediary flange 226. Similarly, the intermediary sleeve 204 may be fixed relative to the external sleeve 206 by joining the outer intermediary flange 230 to the inner flange 228 of the external sleeve 206. The method may further include installing one or more split sleeves 210, 212 about the tubing 220 and inside of the intermediary sleeve 204 and external sleeve 206, respectively.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1: a coiled-tubing bend stiffener comprising: a first, flexible sleeve comprising a first outer flange at an upper end of the first, flexible sleeve and being sized and configured to receive a segment of coiled tubing; an intermediary sleeve having a generally cylindrical body comprising an inner intermediary flange extending from a lower end of the intermediary sleeve and an outer intermediary flange extending from an upper end of the intermediary sleeve; and an external sleeve having a generally cylindrical body comprising an internal flange extending from a lower end of the external sleeve, wherein the first, flexible sleeve is positioned within the intermediary sleeve and wherein the intermediary sleeve is positioned within the external sleeve.

Clause 2: the coiled-tubing bend stiffener of any combination of clause 1, wherein the first, flexible sleeve comprises a constant inner diameter and a tapered outer surface having a first outer diameter at a lower end and a second outer diameter at the upper end, wherein the first outer diameter is smaller than the second outer diameter.

Clause 3: the coiled-tubing bend stiffener of any combination of clauses 1 and 2, wherein an outer diameter of the first outer flange is approximately equal to an inner diameter of the intermediary sleeve and wherein the outer diameter of the outer intermediary flange is approximately equal to the inner diameter of the external sleeve.

Clause 4: the coiled-tubing bend stiffener of any combination of clauses 1-3, wherein the first, flexible sleeve is operable to telescopingly slide within the intermediary sleeve and wherein the intermediary sleeve is operable to telescopingly slide within the external sleeve.

Clause 5: the coiled-tubing bend stiffener of any combination of clauses 1-4, further comprising a second intermediary sleeve, wherein the intermediary sleeve is positioned within the second intermediary sleeve and wherein the second intermediary sleeve is positioned within the external sleeve.

Clause 6: the coiled-tubing bend stiffener of any combination of clauses 1-5, wherein the first, flexible sleeve is operable to telescopingly slide within the intermediary sleeve, the intermediary sleeve is operable to telecscopingly slide within the second intermediary sleeve, and the second intermediary sleeve is operable to telescopingly slide within the external sleeve.

Clause 7: the coiled-tubing bend stiffener of any combination of clauses 1-6, further comprising a contact sleeve positioned within the first, flexible sleeve, the contact sleeve comprising a friction reducing surface.

Clause 8: the coiled-tubing bend stiffener of any combination of clauses 1-7, wherein the friction reducing surface comprises brass and polytetrafluoroethylene.

Clause 9: the coiled-tubing bend stiffener of any combination of clauses 1-8, wherein the friction reducing surface comprises a castellated surface.

Clause 10: the coiled-tubing bend stiffener of any combination of clauses 1-9, further comprising a first split sleeve having an outer diameter that is approximately equal to the inner diameter of the intermediary sleeve and an inner diameter that is approximately equal to the inner diameter of the first, flexible sleeve.

Clause 11: a method of deploying coiled tubing to a subsea wellbore, the method comprising: extending coiled tubing through a bend stiffener, wherein the bend stiffener comprises: a first, flexible sleeve comprising a first outer flange at an upper end of the first, flexible sleeve and being sized and configured to receive a segment of coiled tubing; an intermediary sleeve having a generally cylindrical body comprising an inner intermediary flange extending from a lower end of the intermediary sleeve and an outer intermediary flange extending from an upper end of the intermediary sleeve; and an external sleeve having a generally cylindrical body comprising an internal flange extending from a lower end of the external sleeve, wherein the first, flexible sleeve is positioned within the intermediary sleeve and wherein the intermediary sleeve is positioned within the external sleeve.

Clause 12: the method of clause 11, further comprising: extending the first, flexible sleeve from the intermediary sleeve; and extending the intermediary sleeve from the external sleeve.

Clause 13: the method of any combination of clauses 11 and 12, wherein the bend stiffener further comprises a second intermediary sleeve positioned within the external sleeve, wherein the intermediary sleeve is positioned within the second intermediary sleeve, the method further comprising: extending the intermediary sleeve from the second intermediary sleeve; and extending the second intermediary sleeve from the external sleeve.

Clause 14: the method of any combination of clauses 11-13, wherein the first, flexible sleeve comprises a constant inner diameter and a tapered outer surface having a first outer diameter at a lower end and a second outer diameter at the upper end, wherein the first outer diameter is smaller than the second outer diameter.

Clause 15: the method of any combination of clauses 11-14, wherein the outer diameter of the first outer flange is approximately equal to an inner diameter of the intermediary sleeve and wherein the outer diameter of the outer intermediary flange is approximately equal to the inner diameter of the external sleeve.

Clause 16: the method of any combination of clauses 11-15, further comprising positioning a first split sleeve within the first, flexible sleeve and about the coiled tubing, wherein the first split sleeve has an outer diameter that is approximately equal to the inner diameter of the intermediary sleeve and an inner diameter that is approximately equal to the inner diameter of the first, flexible sleeve.

Clause 17: A subsea intervention system comprising: a coiled tubing spool; a coiled tubing string; and a bend stiffener comprising: a first, flexible sleeve comprising a first outer flange at an upper end of the flexible sleeve and being sized and configured to receive a segment of coiled tubing; an intermediary sleeve having a generally cylindrical body comprising an inner intermediary flange extending from a lower end of the intermediary sleeve and an outer intermediary flange extending from an upper end of the intermediary sleeve; and an external sleeve having a generally cylindrical body comprising an internal flange extending from a lower end of the external sleeve, wherein the first, flexible sleeve is positioned within the intermediary sleeve and wherein the intermediary sleeve is positioned within the external sleeve.

Clause 18: the subsea intervention system of clause 17, wherein the first, flexible sleeve comprises a substantially constant inner diameter and a tapered outer surface having a first outer diameter at a lower end and a second outer diameter at the upper end, wherein the first outer diameter is smaller than the second outer diameter.

Clause 19: the subsea intervention system of any combination of clauses 17 and 18, wherein an outer diameter of the first outer flange is approximately equal to an inner diameter of the intermediary sleeve and wherein the outer diameter of the outer intermediary flange is approximately equal to the inner diameter of the external sleeve.

Clause 20: the subsea intervention system of any combination of claims 17-19, wherein the first, flexible sleeve is operable to telescopingly slide within the intermediary sleeve and wherein the intermediary sleeve is operable to telescopingly slide within the external sleeve.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

What is claimed is:

1. A coiled-tubing bend stiffener comprising:
   a first, flexible sleeve comprising a first outer flange at an upper end of the first, flexible sleeve and being sized and configured to receive a segment of coiled tubing;
   an intermediary sleeve having a generally cylindrical body comprising an inner intermediary flange extending from a lower end of the intermediary sleeve and an outer intermediary flange extending from an upper end of the intermediary sleeve; and
   an external sleeve having a generally cylindrical body comprising an internal flange extending from a lower end of the external sleeve,
   wherein the first, flexible sleeve is positioned within the intermediary sleeve and wherein the intermediary sleeve is positioned within the external sleeve, wherein the first, flexible sleeve is operable to telescopingly slide downhole within the intermediary sleeve when the coiled-tubing bend stiffener is extended; and wherein the intermediary sleeve is operable to telescopinalv slide downhole within the external sleeve when the coiled-tubing bend stiffener is extended.

2. The coiled-tubing bend stiffener of claim 1, wherein the first, flexible sleeve comprises a constant inner diameter and a tapered outer surface having a first outer diameter at a lower end and a second outer diameter at the upper end, wherein the first outer diameter is smaller than the second outer diameter.

3. The coiled-tubing bend stiffener of claim 1, wherein an outer diameter of the first outer flange is approximately equal to an inner diameter of the intermediary sleeve and wherein an outer diameter of the outer intermediary flange is approximately equal to an inner diameter of the external sleeve.

4. The coiled-tubing bend stiffener of claim 1, further comprising a second intermediary sleeve, wherein the intermediary sleeve is positioned within the second intermediary sleeve and wherein the second intermediary sleeve is positioned within the external sleeve.

5. The coiled-tubing bend stiffener of claim 4, wherein the intermediary sleeve is operable to telecscopingly slide within the second intermediary sleeve, and the second intermediary sleeve is operable to telescopingly slide within the external sleeve.

6. The coiled-tubing bend stiffener of claim 1, further comprising a contact sleeve positioned within the first, flexible sleeve, the contact sleeve comprising a friction reducing surface.

7. The coiled-tubing bend stiffener of claim 6, wherein the friction reducing surface comprises brass and polytetrafluoroethylene.

8. The coiled-tubing bend stiffener of claim 6, wherein the friction reducing surface comprises a castellated surface.

9. The coiled-tubing bend stiffener of claim 1, further comprising a first split sleeve having an outer diameter that is approximately equal to an inner diameter of the intermediary sleeve and an inner diameter that is approximately equal to an inner diameter of the first, flexible sleeve.

10. A method of deploying coiled tubing to a subsea wellbore, the method comprising:
    extending coiled tubing through a bend stiffener, wherein the bend stiffener comprises:
        a first, flexible sleeve comprising a first outer flange at an upper end of the first, flexible sleeve and being sized and configured to receive a segment of the coiled tubing;
        an intermediary sleeve having a generally cylindrical body comprising an inner intermediary flange extending from a lower end of the intermediary sleeve and an outer intermediary flange extending from an upper end of the intermediary sleeve; and
        an external sleeve having a generally cylindrical body comprising an internal flange extending from a lower end of the external sleeve,
    wherein the first, flexible sleeve is positioned within the intermediary sleeve and wherein the intermediary sleeve is positioned within the external sleeve; wherein the first, flexible sleeve is operable to telescopingly slide downhole within the intermediary sleeve when the coiled-tubing bend stiffener is extended; and wherein the intermediary sleeve is operable to telescopingly slide downhole within the external sleeve when the coiled-tubing bend stiffener is extended.

11. The method of claim 10, further comprising:
    extending the first, flexible sleeve from the intermediary sleeve; and
    extending the intermediary sleeve from the external sleeve.

12. The method of claim 10, wherein the bend stiffener further comprises a second intermediary sleeve positioned within the external sleeve, wherein the intermediary sleeve is positioned within the second intermediary sleeve, the method further comprising:
    extending the intermediary sleeve from the second intermediary sleeve; and
    extending the second intermediary sleeve from the external sleeve.

13. The method of claim 10, wherein the first, flexible sleeve comprises a constant inner diameter and a tapered outer surface having a first outer diameter at a lower end and a second outer diameter at an upper end, wherein the first outer diameter is smaller than the second outer diameter.

14. The method of claim 10, wherein the outer diameter of the first outer flange is approximately equal to an inner diameter of the intermediary sleeve and wherein an outer diameter of the outer intermediary flange is approximately equal to an inner diameter of the external sleeve.

15. The method of claim 10, further comprising positioning a first split sleeve within the first, flexible sleeve and about the coiled tubing, wherein the first split sleeve has an outer diameter that is approximately equal to an inner diameter of the intermediary sleeve and an inner diameter that is approximately equal to an inner diameter of the first, flexible sleeve.

16. A subsea intervention system comprising:
    a coiled tubing spool;
    a coiled tubing string; and
    a bend stiffener comprising:
        a first, flexible sleeve comprising a first outer flange at an upper end of the flexible sleeve and being sized and configured to receive a segment of the coiled tubing string;
        an intermediary sleeve having a generally cylindrical body comprising an inner intermediary flange extending from a lower end of the intermediary sleeve and an outer intermediary flange extending from an upper end of the intermediary sleeve; and
        an external sleeve having a generally cylindrical body comprising an internal flange extending from a lower end of the external sleeve,
    wherein the first, flexible sleeve is positioned within the intermediary sleeve and wherein the intermediary sleeve is positioned within the external sleeve; wherein the first, flexible sleeve is operable to telesecopingly slide downhole within the intermediary sleeve when the coiled-tubing bend stiffener is extended; and wherein the intermediary sleeve is operable to telescopingly slide downhole within the external sleeve the coiled-tubing bend stiffener is extended.

17. The subsea intervention system of claim 16, wherein the first, flexible sleeve comprises a substantially constant inner diameter and a tapered outer surface having a first outer diameter at a lower end and a second outer diameter at an upper end, wherein the first outer diameter is smaller than the second outer diameter.

18. The subsea intervention system of claim 16, wherein an outer diameter of the first outer flange is approximately equal to an inner diameter of the intermediary sleeve and wherein an outer diameter of the outer intermediary flange is approximately equal to an inner diameter of the external sleeve.

* * * * *